United States Patent [19]

Ueda

[11] Patent Number: 5,084,657
[45] Date of Patent: Jan. 28, 1992

[54] SPOT KILLER CIRCUIT HAVING BLANKING FUNCTION

[75] Inventor: Mitsunori Ueda, Ibaraki, Japan

[73] Assignee: Matsushita Electric Industrial Co., Ltd., Osaka, Japan

[21] Appl. No.: 683,058

[22] Filed: Apr. 10, 1991

[30] Foreign Application Priority Data

Apr. 20, 1990 [JP] Japan .................... 2-106194

[51] Int. Cl.⁵ .................... G09G 1/04; H01J 29/52
[52] U.S. Cl. .................... 315/381; 315/384
[58] Field of Search .................... 315/380, 381, 384; 358/165

[56] References Cited

U.S. PATENT DOCUMENTS 4,814,880  3/1989  Kugimura .................... 358/165

FOREIGN PATENT DOCUMENTS 0090702 10/1983 European Pat. Off. .
60-237768 11/1985 Japan .
63-158974  7/1988 Japan .

*Primary Examiner*—Gregory C. Issing
*Attorney, Agent, or Firm*—Stevens, Davis, Miller & Mosher

[57] ABSTRACT

A spot killer circuit for a cathode ray tube having blanking function is configured to be provided with a positive voltage source, a negative voltage source, two diodes, condensers and a resistor in order to perform blanking in horizontal scanning or vertical scanning by using a first grid of the cathode ray tube. In the configuration, the two diodes are inserted in series between the negative voltage source and the first grid, and a first condenser is inserted between a junction of the two diodes and the positive voltage source. A resistor is connected in parallel with the diode connected to the first grid, and a blanking signal is applied to the first grid through a second condenser.

1 Claim, 3 Drawing Sheets

SPOT KILLER CIRCUIT HAVING BLANKING FUNCTION

BACKGROUND OF THE INVENTION

1. Field of the Invention

The present invention relates to a spot killer circuit capable of effecting blanking in horizontal scanning or vertical scanning by using a first grid of a cathode ray tube comprised in a display unit.

2. Description of the Related Art

Generally, a display unit using a cathode ray tube is provided with a spot killer circuit for cutting off a luminescent spot on a display screen of the cathode ray tube when a power supply switch of the display unit is turned off.

An example of a conventional spot killer circuit is now described with reference to the accompanying drawings.

FIG. 1 is a circuit diagram of a conventional spot killer circuit. In FIG. 1, numeral 1 denotes a cathode ray tube, G1 a first grid of the cathode ray tube 1, and K a cathode of the cathode ray tube 1. A voltage of a negative voltage input terminal 2 is divided by first and second resistors R1 and R2 and the divided voltage at a junction therebetween is applied to the first grid G1 through a first diode D1 having an anode thereof connected to the first grid G1. Further, the first grid G1 is connected to a positive voltage input terminal 3 through a condenser C1.

The operation of the spot killer circuit constructed as shown in FIG. 1 is now described. In this case, it is assumed that the voltage of the negative voltage input terminal 2 is −100 V, a voltage of the positive voltage input terminal 3 is +100 V, and resistance values of the first and second resistors R1 and R2 are identical with each other. Further, a forward voltage drop of the first diode D1 is assumed to be OV.

When a power supply switch (not shown) is turned on, a voltage of −50 V produced by dividing the voltage of the negative voltage input terminal 2 by the first and second resistors R1 and R2 is applied to the first grid G1 and +100 V is applied to the positive voltage input terminal 3. At this time, the first condenser C1 is charged with a voltage of 150 V applied thereacross.

Then, when the power supply switch is turned off, the voltages of the negative voltage input terminal 2 and the positive voltage input terminal 3 are immediately reduced to zero. The potential of the cathode of the first diode D1 is also reduced to zero immediately. However, since the impedance of the first grid G1 is high, the negative voltage of the first condenser C1 is not discharged and the negative voltage side thereof is reduced to −150 V, so that the cathode ray tube 1 is cut off and a luminescent spot can be prevented from appearing on the display screen. The negative voltage across the first condenser C1 is gradually reduced to zero with a time constant defined by a product of a capacitance of the first condenser C1 and the impedance of the first grid G1, so that a luminescent spot can be prevented from remaining on the display screen of the cathode ray tube 1 by making the capacitance of the first condenser C1 preset to have a large value.

FIG. 2 is a circuit diagram of another circuit for effecting blanking in horizontal scanning or vertical scanning by using a first grid of a cathode ray tube 1. Like elements, which have appeared in the circuit diagram of FIG. 1 showing the conventional spot killer circuit, are designated by like numerals. FIG. 3 is a timing chart for explaining an operation of the circuit shown in FIG. 2. A blanking signal in horizontal scanning or vertical scanning is shown at (a) in FIG. 3, in which a period of time from time t1 to time t2 is a blanking period in horizontal scanning or vertical scanning.

A first grid G1 of a cathode ray tube 1 is supplied with a voltage of −50 V produced by dividing a voltage of a negative voltage input terminal 2 by first and second resistors R1 and R2. On the other hand, when a blanking signal for use in horizontal scanning or vertical scanning shown at (a) in FIG. 3 is supplied from a terminal 4 to the first grid G1 through a second condenser C2, the voltage of the first grid G1 assumes a waveform as shown at (b) in FIG. 3, since the impedance of the first grid G1 is high. As a result, since the voltage of the first grid G1 of the cathode ray tube 1 is reduced to −70 V during the blanking period from time t1 to time t2 in horizontal scanning or vertical scanning, the blanking in horizontal scanning or vertical scanning can be attained.

FIG. 4 is a circuit diagram which shows a combination of the circuit configurations shown in FIGS. 1 and 2, respectively, and which shows a circuit for effecting blanking in horizontal scanning or vertical scanning by using a first grid of a cathode ray tube 1 in the above-described conventional spot killer circuit. In FIG. 4, like elements, which have appeared in the circuit diagrams of FIGS. 1 and 2, respectively, are designated by like numerals.

The operation for preventing a luminescent spot from remaining on the display screen of the cathode ray tube can be performed satisfactorily in the same manner as described above. However, since the capacitance of the first condenser C1 is set to have a large value and hence the impedance of the circuit of the first grid G1 is decreased with respect to the blanking signal for use in horizontal scanning or vertical scanning which has been supplied to a terminal 4, a voltage signal supplied to the first grid G1 does not have such a waveform as shown at (b) in FIG. 3, but has a waveform similar to a sawtooth waveform as shown at (c) in FIG. 3 and has an amplitude not reaching −70 V, so that it becomes impossible to perform blanking in horizontal scanning or vertical scanning.

SUMMARY OF THE INVENTION

Accordingly, it is an object of the present invention to provide a spot killer circuit capable of effecting blanking in horizontal scanning or vertical scanning satisfactorily by using a first grid of a cathode ray tube.

A spot killer circuit for a cathode ray tube according to the present invention comprises a circuit for supplying a negative voltage, which is supplied from a negative voltage input terminal 2, to a first grid G1 of the cathode ray tube 1 through first and second diodes D1 and D2 connected in the order of a cathode and an anode of the first diode D1 and a cathode and an anode of the second diode D2, a first condenser C1 connected between a positive voltage input terminal 3 and a junction of the anode of the first diode D1 and the cathode of the second diode D2, a resistor R3 connected in parallel with the second diode D2, and a second condenser C2 through which a blanking signal for use in horizontal scanning or vertical scanning is supplied to the first grid G1 of the cathode ray tube 1.

With the above-described circuit configuration according to the present invention, it is made possible to satisfactorily effect blanking in horizontal scanning or vertical scanning, and, at the same time, to prevent a luminescent spot from remaining on a display screen of the cathode ray tube 1 when power supply to a display unit comprising the cathode ray tube is turned off.

DESCRIPTION OF THE PREFERRED EMBODIMENT

A spot killer circuit of an embodiment of the present invention is now described with reference to the accompanying drawings.

Figure 1:
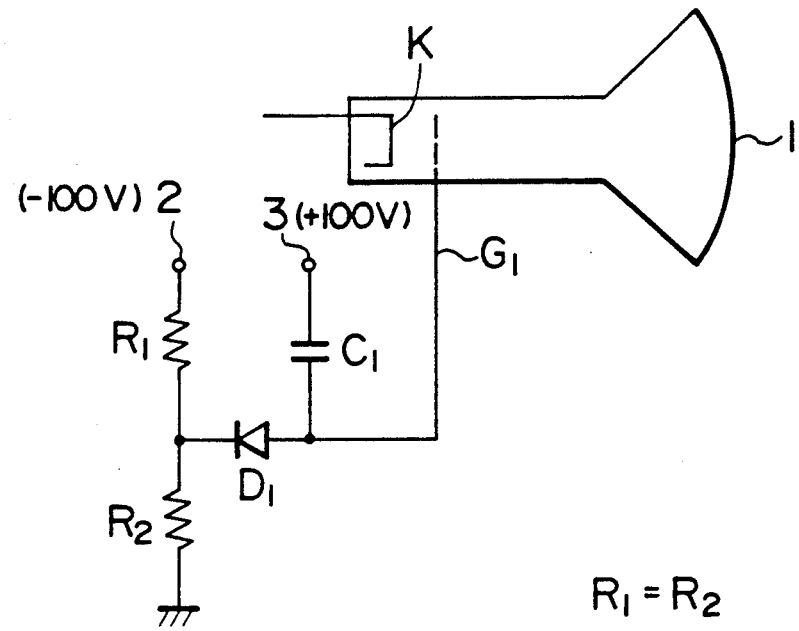
FIG. 1 is a circuit diagram showing a conventional spot killer circuit.
Figure 2:
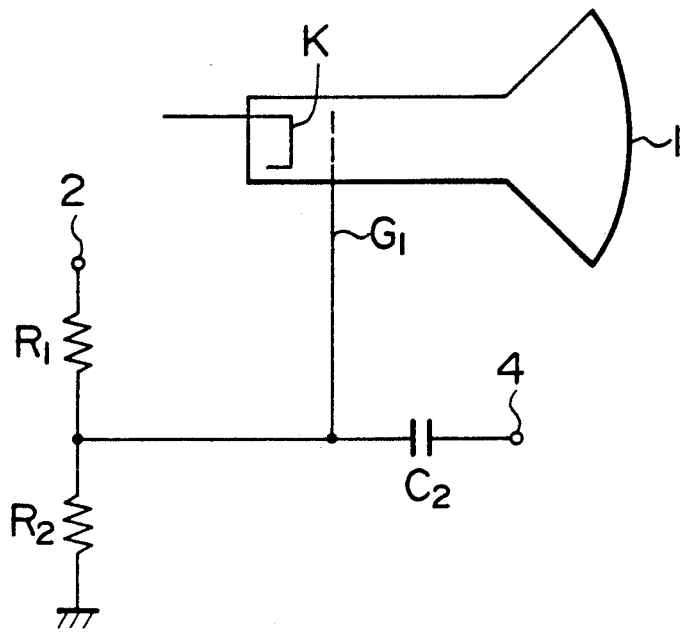
FIG. 2 is a circuit diagram showing a conventional circuit for effecting blanking in horizontal scanning or vertical scanning by using a first grid of a cathode ray tube.
Figure 5:
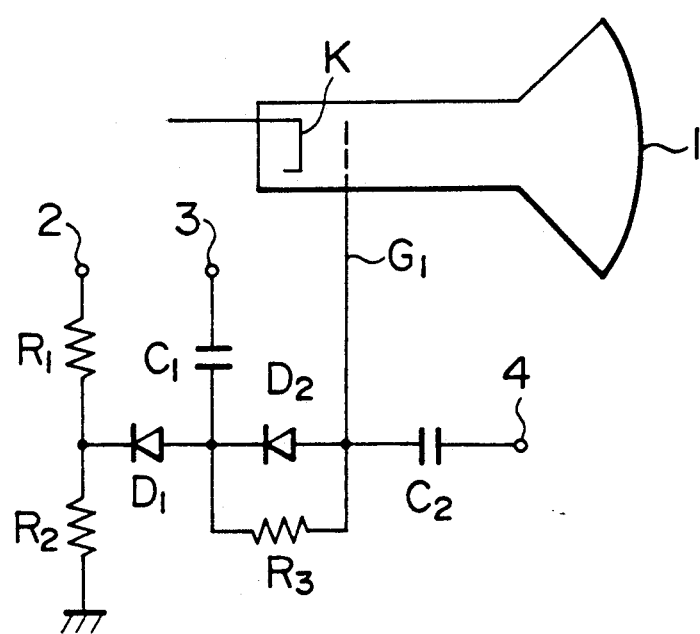
FIG. 5 is a circuit diagram showing a spot killer circuit of an embodiment of the present invention.

FIG. 5 is a circuit diagram showing a spot killer circuit for a cathode ray tube 1 comprised in a display unit (not shown) according to an embodiment of the present invention. Like elements, which have appeared in the conventional circuit diagrams of FIG. 1 and 2, respectively, are designated by like numerals, and the description thereof is omitted.

In FIG. 5, a cathode of a second diode D2 is connected to a junction between an anode of a first diode D1 having its cathode connected to a junction of resistors R1 and R2 and one end of a first condenser C1. An anode of the second diode D2 is connected to a first grid G1 of the cathode ray tube 1. Further, a third resistor R3 is connected in parallel with the second diode D2. It is assumed in the same manner as the conventional circuit that a voltage of a negative voltage input terminal 2 is −100 V, a voltage of a positive voltage input terminal 3 is +100 V, resistance values of the first and second resistors R1 and R2 are identical with each other, and forward voltage drops of the first and second diodes D1 and D2 are both zero volt.

When a power supply switch (not shown) of the display unit is on, a voltage of −50 V produced by dividing the negative voltage of the negative voltage input terminal 2 by the first and second resistors R1 and R2 is supplied to the first grid G1 through the first and second diodes D1 and D2. Further, since +100 V is supplied to the positive voltage input terminal 3, the first condenser C1 is charged by a voltage of 150 V applied thereacross.

Then, when the power supply switch is turned off, the respective voltages of the negative voltage input terminal 2 and the positive voltage input terminal 3 are immediately reduced to zero, so that the potential of the cathode of the first diode D1 immediately becomes zero voltage. Accordingly, a negative voltage at one end of the first condenser C1 connected to a junction of the first and second diodes D1 and D2 is not discharged through the first diode D1. Also, the negative voltage at one end of the first condenser C1 is not discharged through the second diode D2 and hence the said one end of the first condenser C1 remains at −150 V, since the impedance of the first grid G1 of the cathode ray tube 1 is high. Accordingly, the first grid G1 also assumes a potential of −150 V and operates to cut off the cathode ray tube 1, which surely prevents appearance of a luminescent spot on the display screen. Then, the negative voltage of the first condenser C1 is gradually reduced to zero voltage with a time constant determined by a product of the capacitance of the first condenser C1 and a sum of the resistance of the third resistor R3 and the impedance of the first grid G1. Thus, it is possible to completely prevent a luminescent spot from remaining on the display screen of the cathode ray tube 1 by making the capacitance of the first condenser C1 preset to have a large value.

Figure 3:
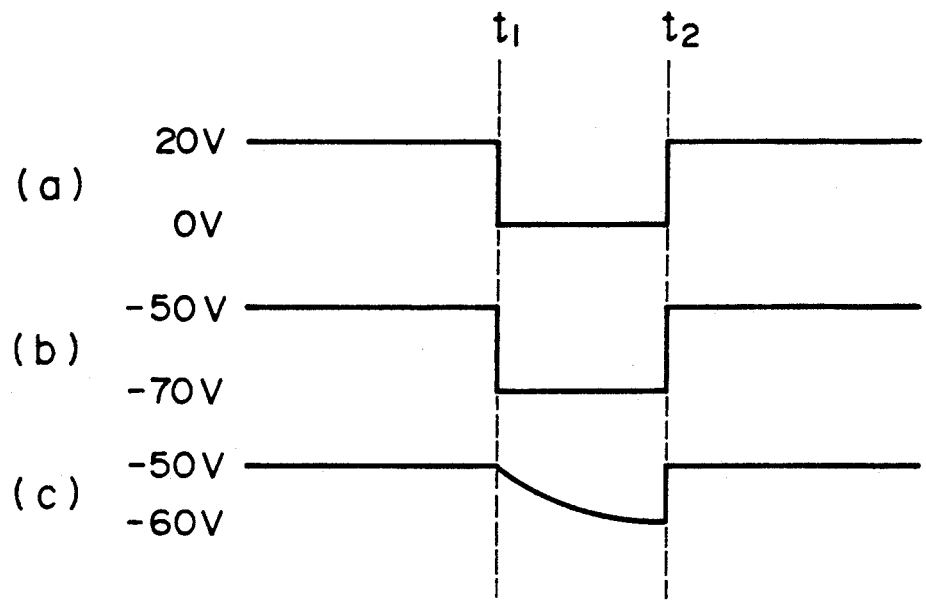
FIG. 3 is a signal waveform diagram for explaining the operation of the circuit shown in FIG. 2.
Figure 4:
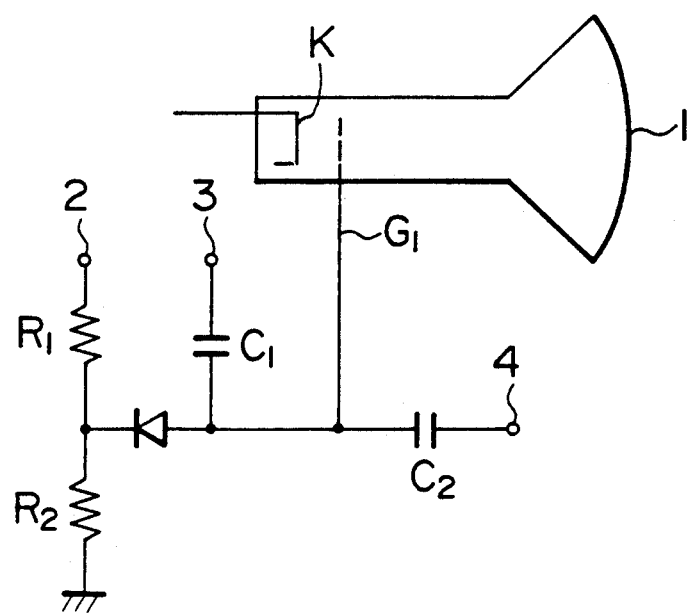
FIG. 4 is a circuit diagram showing a conventional spot killer circuit for effecting blanking in horizontal scanning or vertical scanning by using a first grid of a cathode ray tube.

Further, when the blanking signal for use in horizontal scanning or vertical scanning as shown at (a) in FIG. 3 is supplied to the first grid G1 from the terminal 4 through the second condenser C2, it is possible to prevent the blanking signal from being influenced by the capacitance value of the first condenser C1, if a resistance value of the third resistor R3 is preset to have a sufficiently large value. Thus, the voltage of the first grid G1 of the cathode ray tube 1 can be reduced to −70 V during the blanking period from time t1 to time t2 in horizontal scanning or vertical scanning, as shown at (b) in FIG. 3, so that the blanking in horizontal scanning or vertical scanning can be performed surely.

As described above, in the spot killer circuit for a cathode ray tube having blanking function and comprised in a display unit according to the present invention, there are provided a circuit for supplying a negative voltage, which is supplied from a negative voltage input terminal connected to a negative voltage source, to a first grid of the cathode ray tube through first and second diodes connected in series in the order of a cathode and an anode of the first diode and a cathode and an anode of the second diode, a first condenser connected between a positive voltage input terminal connected to a positive voltage source and a junction of the anode of the first diode and the cathode of the second diode, a resistor connected in parallel with the second diode, and a second condenser through which a blanking signal for use in horizontal scanning or vertical scanning is supplied to the first grid of the cathode ray tube, whereby it is made possible to use the first grid of the cathode ray tube to effect blanking during horizontal scanning or vertical scanning satisfactorily and to surely prevent a luminescent spot from remaining on the display screen of the cathode ray tube when power supply to the display unit is turned off.

I claim:

1. A spot killer circuit for a cathode ray tube having blanking function comprising: a circuit for supplying a negative voltage, which is supplied from a negative voltage input terminal connected to a negative voltage source, to a first grid of the cathode ray tube through first and second diodes connected in series in the order of a cathode and an anode of said first diode and a cathode and anode of said second diode, a first condenser connected between a positive voltage input terminal connected to a positive voltage source and a junction of the anode of said first diode and the cathode of said second diode, a resistor connected in parallel with said second diode, and a second condenser through which a blanking signal for use in one of horizontal scanning and vertical scanning is supplied to the first grid of the cathode ray tube.

* * * * *